United States Patent [19]

Shelton

[11] Patent Number: 4,623,780
[45] Date of Patent: Nov. 18, 1986

[54] COLLECTRAMATIC FOOD WARMER

[75] Inventor: Winston L. Shelton, Jeffersontown, Ky.

[73] Assignee: Properties Leasing Company Inc., Louisville, Ky.

[21] Appl. No.: 521,344

[22] Filed: Aug. 8, 1983

Related U.S. Application Data

[63] Continuation-in-part of Ser. No. 187,359, Sep. 15, 1980, abandoned.

[51] Int. Cl.[4] ............................................ F27D 11/00
[52] U.S. Cl. .................................. 219/401; 219/400; 126/20
[58] Field of Search ............... 219/400, 401, 362, 385, 219/386, 387; 126/20, 21 A, 21 R, 281, 369; 99/474, 476; 312/236; 34/195, 196, 197, 198

[56] References Cited

U.S. PATENT DOCUMENTS

| | | | |
|---|---|---|---|
| 2,499,525 | 3/1950 | Person | 219/400 |
| 2,939,423 | 6/1960 | Luce | 219/400 |
| 3,424,231 | 1/1969 | Truhan | 219/400 |
| 3,901,053 | 8/1975 | Meisen | 219/401 |
| 4,010,349 | 3/1977 | Lee | 219/400 |
| 4,030,476 | 6/1977 | Hock | 219/400 |
| 4,108,139 | 8/1978 | Gilliom | 219/400 |
| 4,173,215 | 11/1979 | Bureau | 219/401 |
| 4,189,995 | 2/1980 | Löhr | 126/21 A |
| 4,237,623 | 12/1980 | Timm | 34/198 |
| 4,244,979 | 1/1981 | Roderick | 99/474 |

Primary Examiner—C. L. Albritton
Assistant Examiner—Teresa J. Walberg
Attorney, Agent, or Firm—Edward M. Steutermann

[57] ABSTRACT

A new and useful method and apparatus for processing food at selected temperatures including food holding cabinet; food support means disposed within the food holding cabinet to receive the food to be processed; a liquid reservoir to hold a selected liquid to be evaporated from a surface thereof; first heater to heat the liquid to be evaporated to a first temperature, second heater to heat air in the food holding cabinet to increase the temperature of the air in the food holding cabinet to a second temperature where the operation of the first and second heaters can be simultaneous.

9 Claims, 14 Drawing Figures

FIG 1

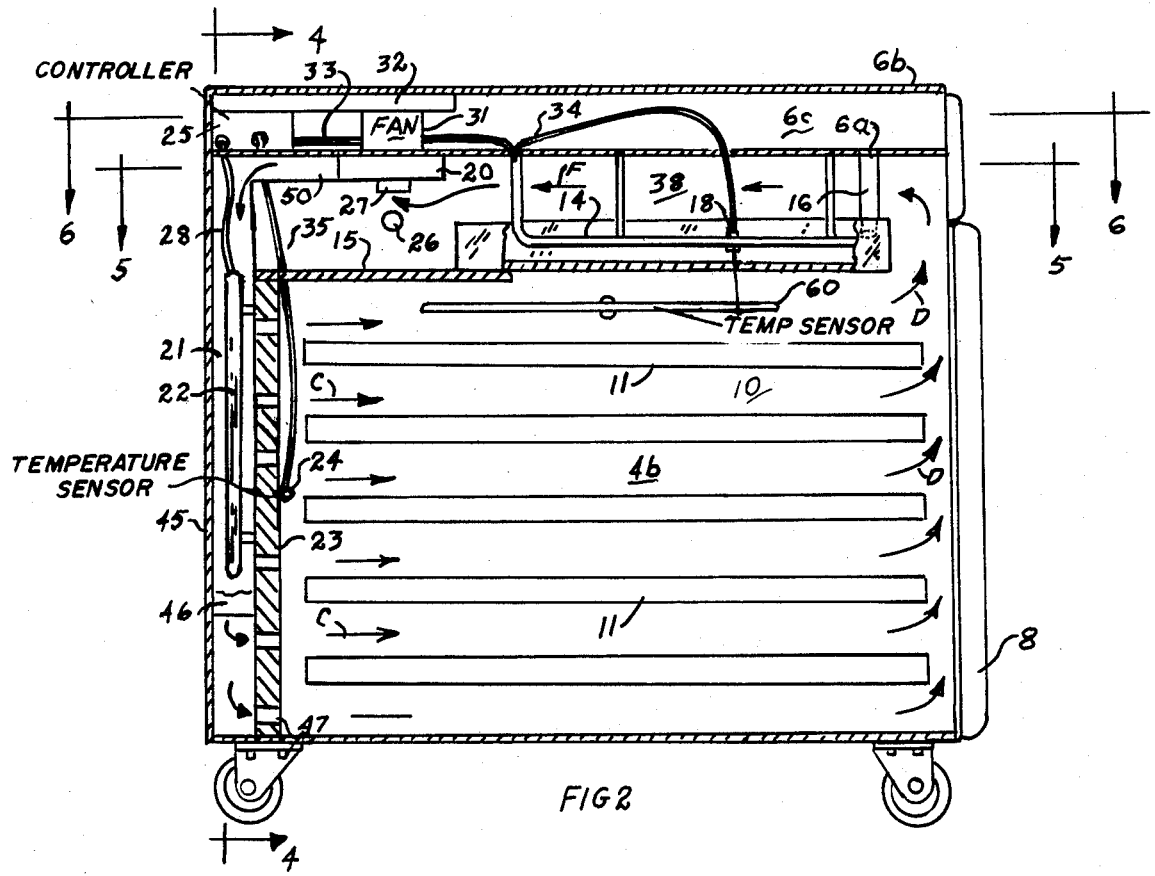
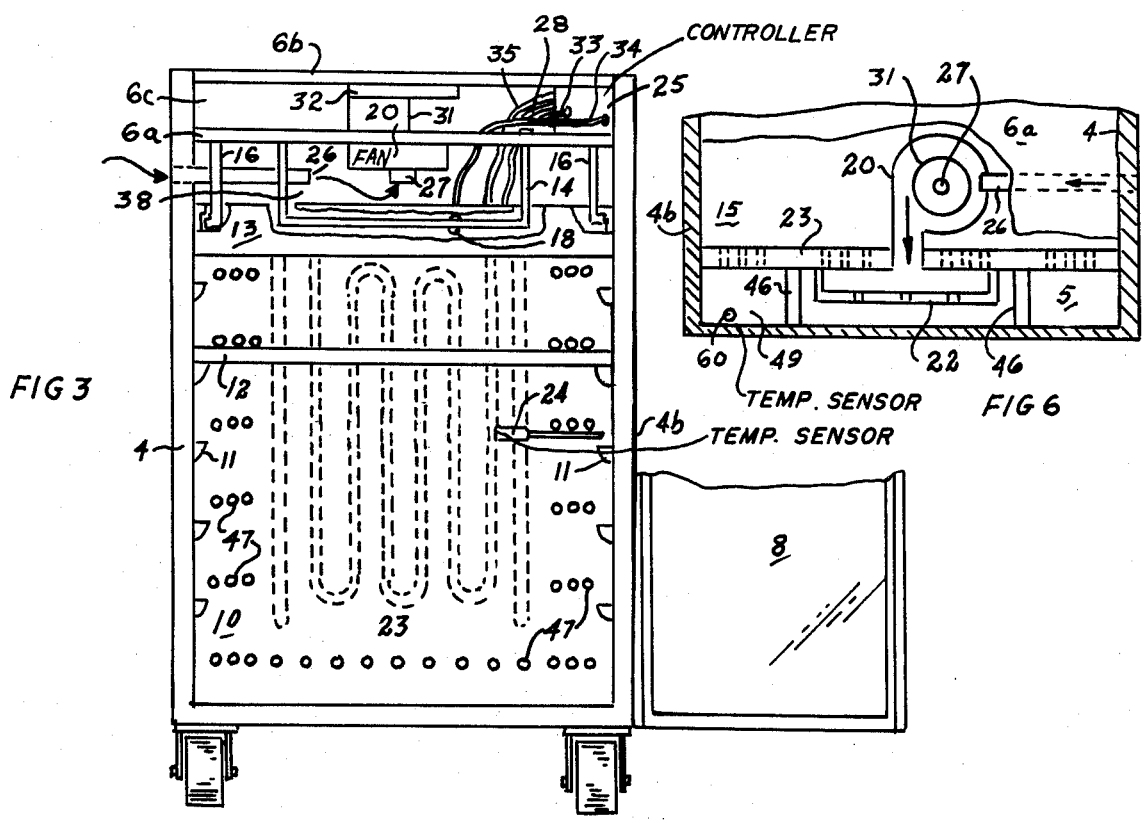

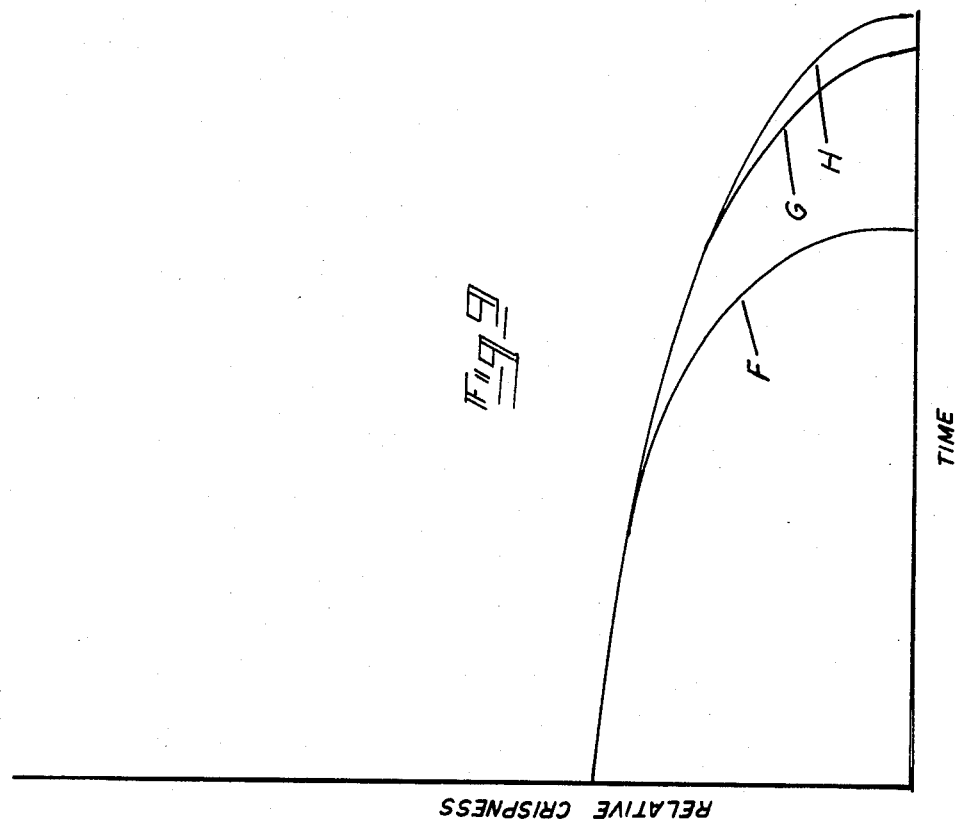
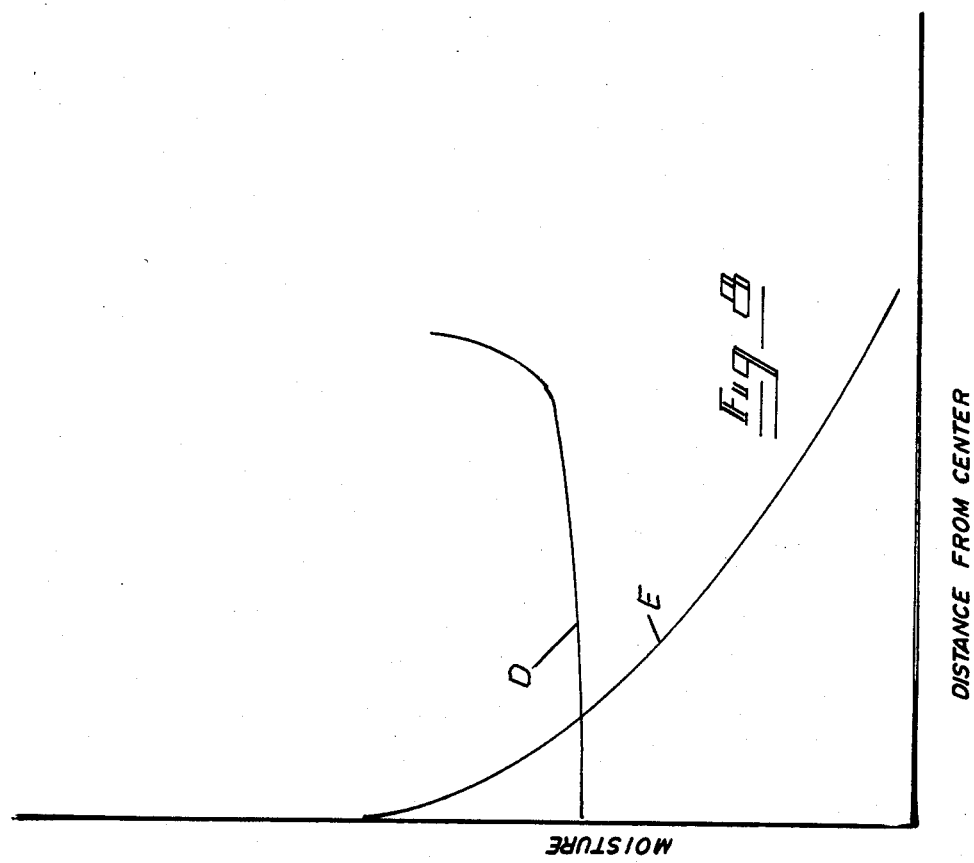

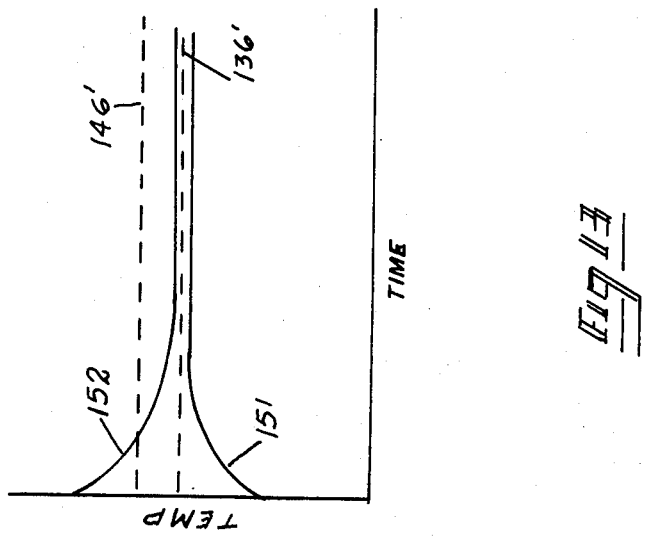
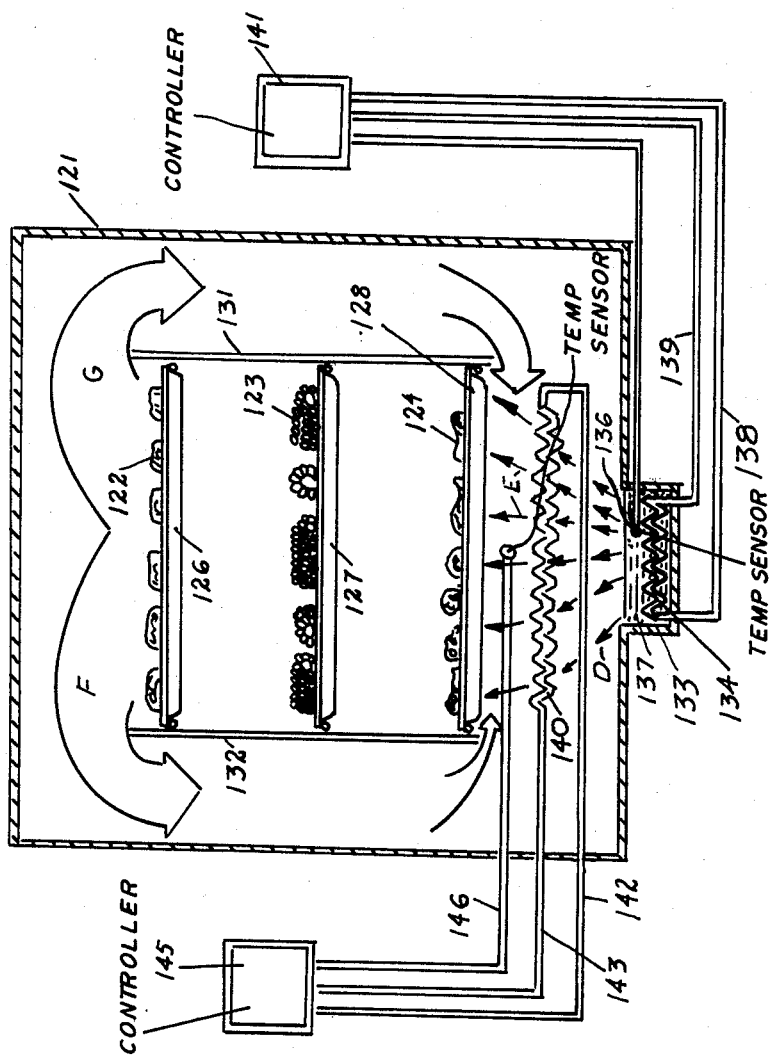
Fig. 13
Fig. 12

COLLECTRAMATIC FOOD WARMER

This application is a continuation-in-part of U.S. patent application Ser. No. 187,359, filed Sept. 15, 1980, now abandoned. The present invention relates to a food processing device and particularly to devices useful, for example, where food is precooked and must be maintained at a selected temperature until served or where the food is to be slowly cooked.

BACKGROUND OF THE INVENTION

With the increasing popularity of "fast food" establishments where food is precooked for later sale, there is a demand for food holding devices to maintain food at substantially uniform temperatures for extended periods of time while preserving the taste and moisture content of the food.

Storage of food for such purposes is difficult in many instances because of heat loss, bacterial growth and moisture loss experienced by the food in storage. Specifically, air circulation and improper storage temperature promotes bacterial growth, excessive loss of moisture and excessive shrinkage so that the food deteriorates in many instances after only a short period of time and loses its tenderness, appetizing taste and appearance.

Various prior art devices and methods are known to store food, for example, as shown in U.S. Pat. No. 4,038,968—Rovell and U.S. Pat. No. 3,955,007—Roderick, where means are provided for humidification and circulation of warm moist air around the food to maintain the food at a uniform temperature while preserving the moisture content therein but such prior art leaves several problems unresolved.

More particularly, U.S. Pat. No. 3,955,007—Roderick utilizes a moisture container assembly mounted in a heat holding compartment located above a gas burner assembly. The amount of moisture circulating in the air in the heat holding compartment bears no relationship to the temperature of the air so the moisture content is subject to change with the rate of heat supplied to the humidifier.

In most prior art arrangements where an attempt is made to maintain temperature of the product while maintaining moisture content, a source of moisture is located in the cabinet, but no attempt is made to interrelate wet bulb and dry bulb temperatures to maintain a desired rate of moisture evaporation to control food shrinkage or food crispness each being important to different foods.

In the storage of some foods, such as fried chicken or fish, where a crust is provided, it is particularly desirable to maintain the crispness of the crust while minimizing moisture loss from the underlying meat. Excessive moisture loss in such instances results in unwanted shrinkage and loss of tenderness and texture of the meat.

Accordingly, prior art devices which provide only saturated air to the storage compartment do not recognize the dynamics of food storage and can lead to situations where breading crust or other materials on the surface of the food become soggy so the food loses its appeal even though the underlying meat may be drying out.

Moreover, a second and equally important problem is caused by bacterial growth in the food. Despite the fact that prior art devices provide means for circulating warm moist air and reduce the rate of moisture loss from food, bacterial growth, if not controlled, simultaneously causes the food to deteriorate so that the food in the warming compartment deteriorates at an accelerated rate.

Another requirement exists in the case of some foods where quality is adversely affected by shrinkage from moisture loss. Typically these foods may be no longer palatable where the moisture loss has reached 5%. The prior art did not provide control of moisture loss and therefore provided no means to effectively control holding time allowable yet not exceed critical shrinkage values.

No previous art is known which teaches or discloses any method providing means to control the evaporation rate from stored food to maintain it at a selected level of crispness while controlling the storage temperature so the food will be maintained relatively free of bacterial growth to extend its storage life and/or provide improved quality of the food as dispensed.

Most present commercial devices concede the importance of increasing the magnitude of the wet bulb temperature by providing a water pan or tray within the compartment to add moisture to the air. None, however, control the wet bulb temperature and dry bulb temperature to preserve a controlled rate of evaporation while preserving the crispness of the crust. Further, air leakage from the cabinet, and frequent door openings, reduce the wet bulb temperature to levels that allow the product to be evaporatively cooled to temperatures well below the critical temperature permitting bacterial growth. In this regard it has been found that in many instances the use of blowers in food holding cabinets can be disadvantageous because of the low pressure at the center of the air moving device which can draw in ambient air and because of the higher pressures resulting from the blower which can cause conditioned air to leak out of the cabinet.

SUMMARY OF THE INVENTION

The present invention provides a new and useful method and device for maintaining food at a uniform condition in storage where provision can be made to control the rate of moisture evaporation to maintain the desired crispness of the food being stored while retaining the moisture content of the food.

The present invention further provides a new and useful method and apparatus for minimizing growth of bacteria in food during storage by maintaining the temperature of the food in a selected range by the use of super heated vapor which is exposed to the food being stored.

As previously discussed the moisture content and shrinkage of food in storage is extremely important. It has been found that devices within the scope of the present invention effectively control moisture and shrinkage to retain the palatable quality of foods in storage.

Moreover, it has been found that the rate of growth of the bacteria in a given environment, and in particular in a warming or storage device, declines to a minimum at a temperature range of approximately 150° F. and the rate of bacterial growth increases only slightly in a temperature range extending upwardly to approximately 180° F.

Within the scope of the present invention it has been found that the proper food storage characteristics result in superior food quality, for example in the storage of baked items, prepared poultry or meats, or other foods, obtained by providing a conditioning air stream within a storage cabinet by first increasing the moisture control of the air with water vapor and then passing the air over a second heater or super heater, where the dry bulb temperature of the air is raised to a temperature between 150° F. and 180° F. depending upon the degree of crispness it is desired to maintain in the surface of the cooked product.

Moreover, the present invention recognizes that in most instances the food product is prepared at a particular temperature and is stored at a somewhat lower temperature. Accordingly, as the food commences to cool on storage, a portion of the cooling results from evaporative cooling which results in a decrease in moisture of the food product. However, when the air provided in the storage area is saturated the moisture from the inside of the food migrates to the surface of the food but cannot evaporate so that the food surface becomes undesirably soggy. In accordance with one feature of the present invention, it has been found that in food products, the crispness of the surface of the food and the temperature of the food can be maintained for maximum length of time by exposing the food to air at selected temperatures and humidity.

In one example in accordance with the present invention, superheated air is admitted to the food cabinet through baffle means as the air stream circulates uniformly around the food located on the shelves within the cabinet to maintain the food in the most ideal environment until it is served.

In another example, the air is not circulated but natural convective currents are utilized to maintain the quality of the food.

Within the scope of the present invention, it has further been found that moisture in the air in the cabinet can be kept at a constant level by submerging a first heating unit in a water source located within the cabinet to transfer heat to the water to maintain the water at a constant temperature, for example 150° F. to insure evaporation of the water into the air at this temperature.

Further, devices within the scope of the present invention can be utilized in slow cooking of certain foods. Specifically, it has been unexpectedly found that by maintaining selected interrelated wet bulb and dry bulb temperature ranges food, for example biscuits, cook uniformly without loss of significant moisture to provide a food product of excellent quality.

Additionally, it has been found that devices within the scope of the present invention can be provided with control means to provide specific interrelationship between the heat supplied to the reservoir and to the air to control the relationship between the wet bulb and dry bulb temperature in the chamber. In such cases it has been found effective to provide means to interconnect the operation of the heater or the reservoir and the air heater to provide unexpectedly good results.

Such arrangements eliminate the problems associated with the prior art and particularly U.S. Pat. No. 3,955,077—Roderick, where the heater unit and moisture tray are located beneath the food compartment and where the heat is supplied to the tray so that a saturated atmosphere presented within the cabinet. In this regard it has been found that, particularly with respect to poultry, a fully saturated atmosphere can also be undesirable.

More particularly, the present invention provides a new and useful method and apparatus for processing food at selected temperatures including food holding cabinet; food support means disposed within the food holding cabinet to receive the food to be processed; a liquid reservoir to hold a selected liquid to be evaporated from a surface thereof; first heater to heat the liquid to be evaporated to a first temperature, second heater to heat air in the food holding cabinet to increase the temperature of the air in the food holding cabinet to a temperature greater than the first temperature.

It will be recognized that various other arrangements within the scope of the present invention will occur to those skilled in the art upon reading the disclosure set forth hereinafter.

BRIEF DESCRIPTION OF THE DRAWINGS

One example of a device within the scope of the present invention is shown in the accompanying drawings wherein:

FIG. 1 is a perspective view of one example of a food warming arrangement within the scope of the present invention;

FIG. 2 is a view of the food warming cabinet showing a view of FIG. 1 taken along a plane passing through line 2—2 of FIG. 1;

FIG. 3 is a front view of the arrangement shown in FIG. 1 with the door open;

FIG. 6 is a partial plan view of a rear section of the device shown in FIG. 1, taken along a line passing through a line 6—6 of FIG. 2;

FIG. 8 is a graph showing typical moisture content of food at various locations upon storage;

FIG. 9 is a graph illustrating relative crispness of the surface of fried foods for different storage periods at different relative humidity of the air circulated over the food;

FIG. 12 is a schematic illustration of another arrangement within the scope of the present invention;

FIG. 13 is a graphic illustration of the characteristics of the device shown in FIG. 12.

DETAILED DESCRIPTION OF THE DRAWINGS

Figure 1:
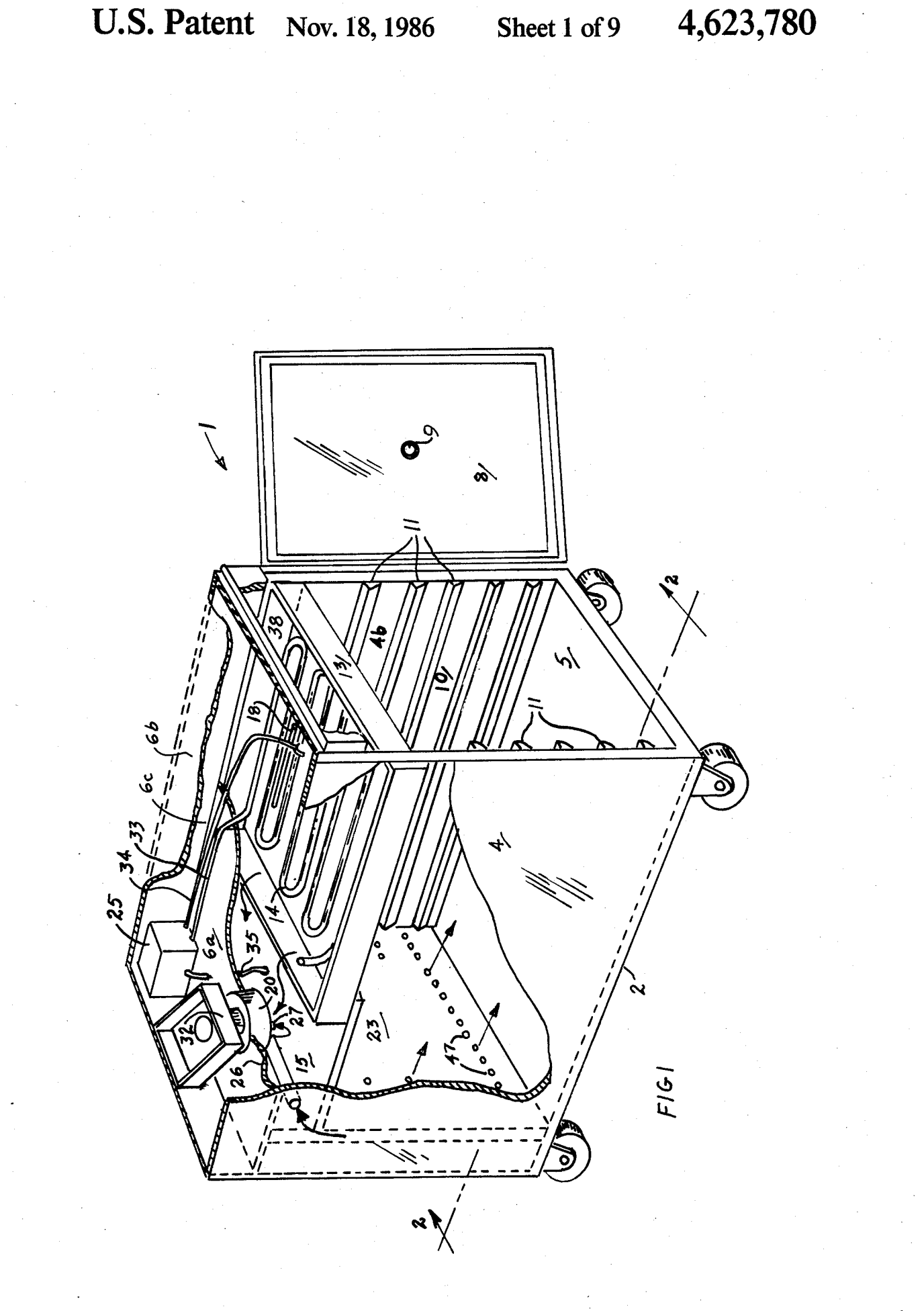
Figure 5:
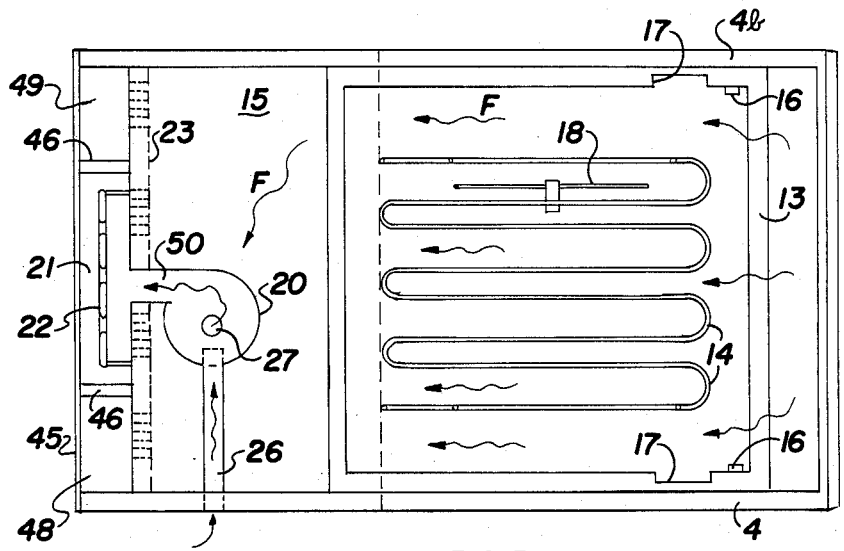
FIG. 5 is a plan view of an arrangement shown in FIG. 2 taken along a line passing through a line 5—5 of FIG. 2.

Referring now to the drawings and particularly to FIG. 1, where an example of one arrangement within the scope of the present invention is disclosed, a food processing device 1 is shown including a cabinet defined by two spaced parallel sidewalls 4 and 4b, an insulated bottom 5, top wall 6a and top 6b. Compartment 6c is defined between top wall 6a and top 6b as shown in FIGS. 1 and 2 to receive fan and control means as described hereinafter. Door means 8 are provided having an air outlet means 9 advantageously located therein for emission of selected quantities of air from compartment 10.

Compartment 10 defined within cabinet means is provided with tray support means, for example ledges 11, advantageously positioned at selected levels on both sidewalls 4 and 4b to retain food support means, for example trays 12, as shown in FIG. 3.

A first temperature sensor means 18 is provided to be submerged in the water in tray 13 to monitor the temperature of the water and is operatively connected to controller means 25 which controls the supply of energy, for example electricity, to maintain the water in tray 13 at the selected temperature. As shown lead 33 is provided to heater 14 and controller 25 to supply electrical energy to heater 14 where a lead 34 connects sensor 18 with controller 25.

It should be understood that within the scope of the present invention sensor 18 can be advantageously located in any position relative to tray 13 to accurately reflect the temperature of the water contained therein and in the arrangement shown is located immediately adjacent heater 14 so that as the water evaporates from tray 13 the sensor will immediately be heated above the set point and turn off the heater.

As shown in FIGS. 1–3, a fan means 20 is provided to receive air from air flow conduit means 38 by means of inlet 27 and is provided with an outlet plenum 50 to circulate air in the cabinet means as hereinafter described.

Figure 4:
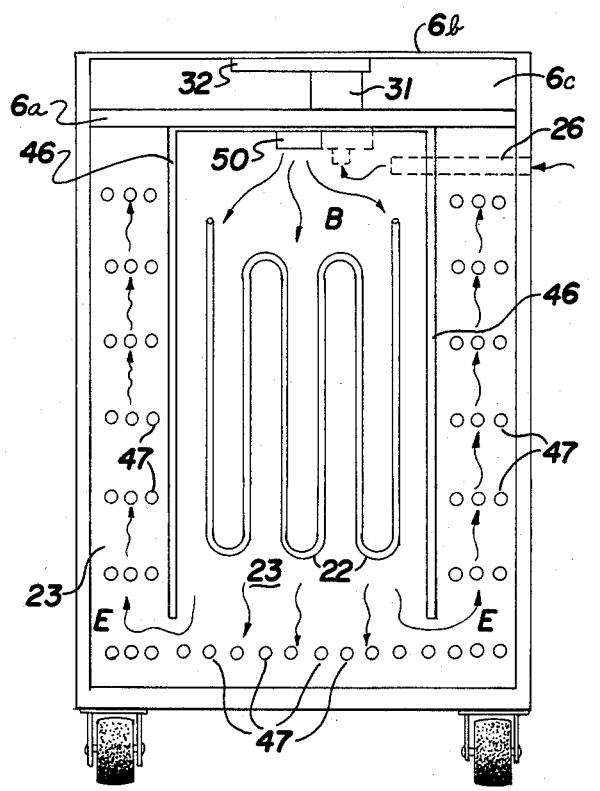
FIG. 4 is a rear view of the arrangement shown in FIG. 2 taken along a line passing through line 4—4 of FIG. 2.
Figure 7:
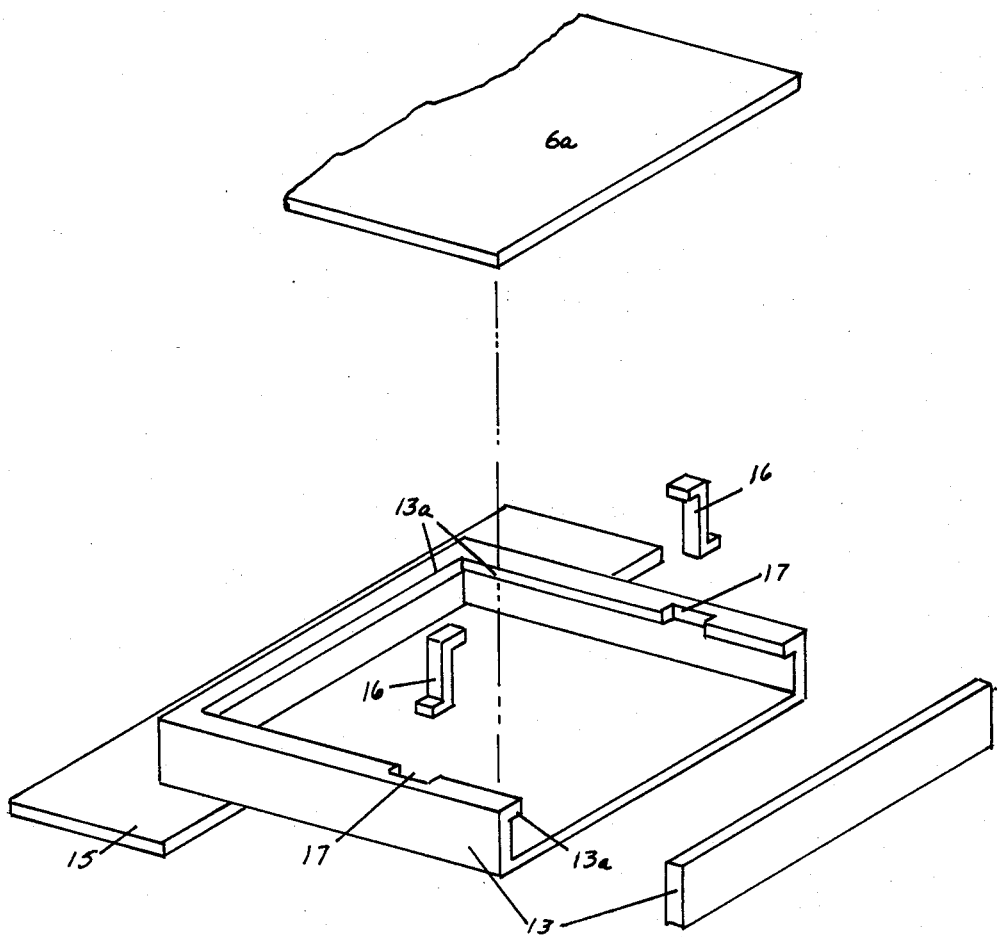
FIG. 7 is an exploded perspective view of an example of a tray and support arrangement for use in the device described herein.

Also within the scope of the present invention a second air flow conduit 21 can be provided at the rear of the unit defined between a vertical wall and baffle 23 where air from plenum 50 can be superheated to a second temperature of equal to or higher than the saturation temperature to control the evaporation rate. As shown in FIGS. 1–5, baffle 23 is inset from a second wall 45 to define chamber 21 therebetween where baffle 23 includes apertures 47 as shown in FIG. 4, and conduit 21 is defined between baffle 23, wall 45 and parallel spaced sidewalls 46. Plenum 50 from fan 20 is connected to supply air flow downwardly into conduit 21 over heater 22 as shown by arrows B in FIG. 4. Air from the bottom of conduit 21 is emitted to a plenum chamber 48 and 49, as shown by arrow E, to flow through apertures 47 into compartment 10 as shown by arrows C in FIG. 2. The number of apertures 47 provided at each level can be increased toward the top of baffle 23 to provide uniform rate of air emission throughout the cabinet. The air then flows over trays 12 to maintain the temperature and moisture of food materials (not shown) contained therein and flows upwardly as shown by arrows D to conduit 38 for recycling. The fan means 20 is powered by a motor 31 which is located in chamber 6c which is provided with a duct means 32 to provide fresh cooling air to motor 31.

Second heater means 22 receives power by means of lead 28 from controller 25. A temperature sensor 24 is provided on the downstream side of heater 22 and is connected by lead 35 to controller 25 to maintain a selected air temperature. Within the scope of the present invention, sensor 24 could also be located in the food compartment to reflect the overall temperature within the compartment but for purposes of illustration the sensor 24 is attached to baffle means 23 and alternate locations 60 are shown in FIG. 6 and in FIG. 2.

Within the scope of the present invention a secondary inlet 26 can advantageously be positioned in sidewall 4 to communicate with inlet 27 of fan means 20 to provide fresh air to be circulated through cabinet means 2 and to exhaust heated moist air at outlet 9 for the purpose of obtaining ideal storage conditions as soon as possible after introduction of freshly cooked foods. In operation the sensor 18 and controller 25 are adapted to maintain the temperature of the saturated air at approximately 150° F. where the drybulb temperature is raised to the range of 150° F.–180° F. and the air stream is then admitted to the food compartment where food trays 12 are provided to hold the food to be maintained at the desired temperature until served. The superheated air is then directed through opening 47 and baffle 23 at selected levels to a food compartment 10 where it passes around the food to be maintained at selected temperatures and moisture.

As previously discussed, the food in prepared at characteristic temperature and is placed in compartment 10 for storage. Immediately upon placing the food in the compartment which is maintained at a temperature less than the cooking temperature, the food product begins to cool. The cooling occurs both through conductive heat transfer to the air stream provided in compartment 10 and through evaporative cooling resulting from evaporation of the moisture within the food product. The various characteristics are illustrated in FIG. 8 where moisture is shown plotted against diameter of the food product from the center. Graph E is an illustration of the moisture content throughout the food product where the food product is not exposed to saturated air. As shown, the moisture content decreases from the center of the food product to the surface. It will be recognized that characteristics illustrated in FIG. 8 are merely typical and the exact relationship depend upon the variables to which the food is exposed. Graph D is an illustration of a situation where saturated air is provided at the surface so that the moisture is added in some instances, to the surface of the food upon cooling and the minimum moisture occurs within the food product below the surface.

Additionally, FIG. 9 is an illustration of an occurance within the scope of the present invention where relative crispness is shown in relation to time for various degrees of relative humidity in the air circulated through the cabinet. As shown, curve F illustrates a change of crispness with respect to time in situations where saturated air is circulated over the food. The relative crispness of the surface of the food diminishes from 100 to 0 with time as moisture accumulates on the surface of the food. Curve G is an illustration of relative crispness, for example at 90% humidity while curve H is an example of relative crispness, for example 75% relative humidity in the circulating air.

As previously discussed, it has been further found that devices of the type within the scope of the present invention can be utilized for slowly cooking food to provide a uniformly cooked food product without significant loss of moisture so the product is of excellent quality.

Figure 10:
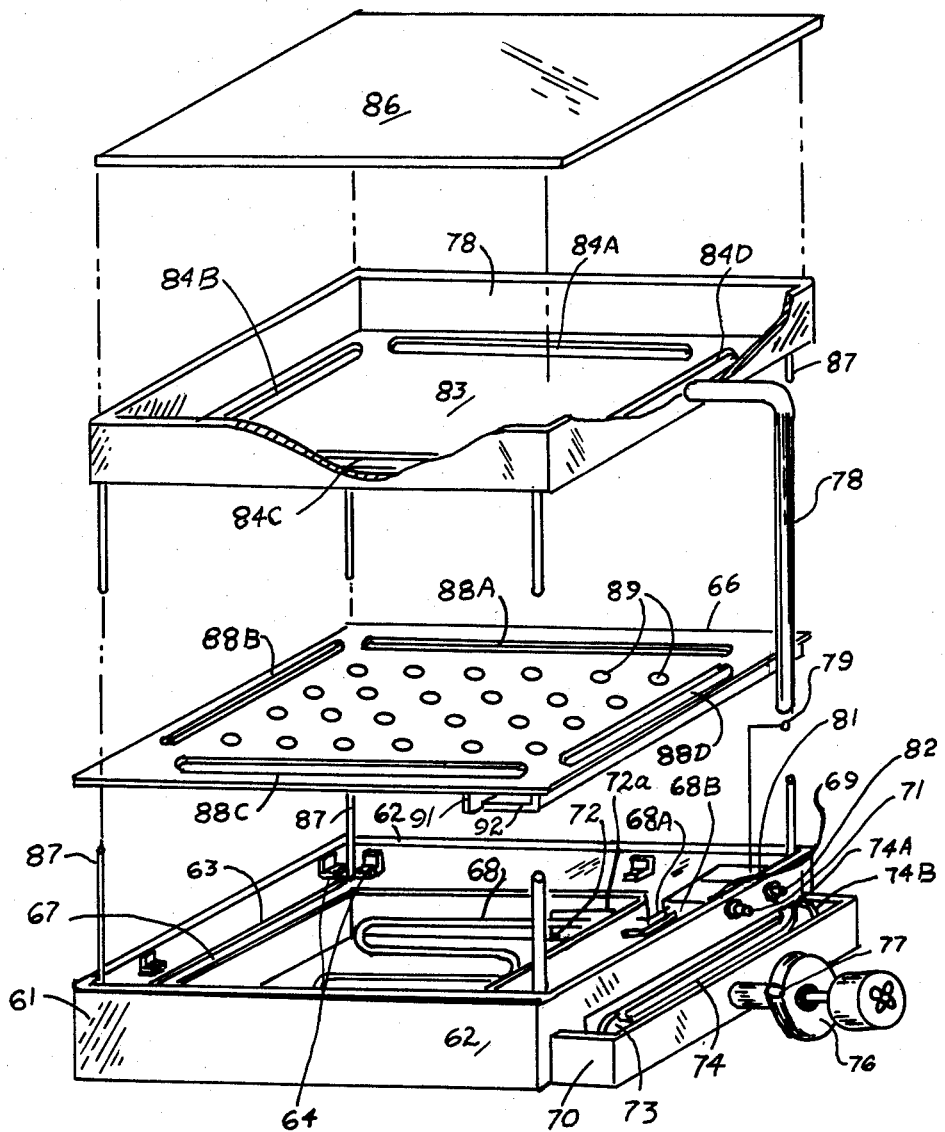
FIG. 10 is a perspective exploded view of another arrangement within the scope of the present invention.

FIG. 10 is a perspective view of another arrangement within the scope of the present invention where the principals of the invention are illustrated in a food display and dispensing device.

As shown, a base 61 is provided having upstanding sidewalls 62 defining a chamber 63. Support means, for example bracket 64, are provided on the inner surfaces of sidewalls 62 to support a shelf 66 as described hereinafter in spaced relation from the bottom of base 61 to define a top side of chamber 63.

A reservoir 67 is provided within chamber 63 to hold a liquid, for example water, for humidification of air passing through chamber 63 as described hereinafter. An electric heating coil 68 can be provided within reservoir 67 to heat the liquid to a selected temperature to provide the desired wet bulb temperature in the air emitted from chamber 63 and can be regulated by a thermostat 69 where an adjusting knob 71 is provided in one of the walls 62. Power leads 68a 68b from heating coil 68 can be adapted to plug into thermostat 69 as can lead 72a of a temperature sensor 72 provided to continuously sense the temperature of the liquid in reservoir 67 to control operation of heater 68 to regulate the temperature of the liquid in reservoir 67.

An outlet plenum 73 is provided to receive humidified air from base 62 and, as shown can include a heater coil 74 to heat the air to a selected temperature where a blower 76 is provided to draw the air from plenum 73 for circulation.

Outlet 77 of blower 76 communicates with a top plenum 78.

A temperature sensor 79 can be provided in outlet 78 to transmit the temperature of the air in outlet 77 to a controller 81 which regulates the energy supplied to heater 74 by leads 74A, 74B where air adjustment 82 is provided to select the desired temperature of the air in outlet 79.

While various air distribution arrangements can be provided in the arrangement shown in FIG. 10, top plenum 78 is provided with a bottom 83 having outlets 84 around the periphery thereof so that the circulating air is emitted as curtains around the edge of top 78 and flows downwardly to base 62. As shown, a top 86 is provided to close the top side of plenum 78.

Supports 87 are further provided to maintain plenum 77 in spaced relation above base 62.

As shown, shelf 66 is received in base 62 and includes slots 88A–88D around the periphery with intermediate aperture 89 spaced through shelf 66.

Baffles 91,92 can be provided to direct air from slot 88D over reservoir for humidification and prevent imbalanced air flow which could occur because of the proximity of baffle 84D and plenum 73.

Figure 11:
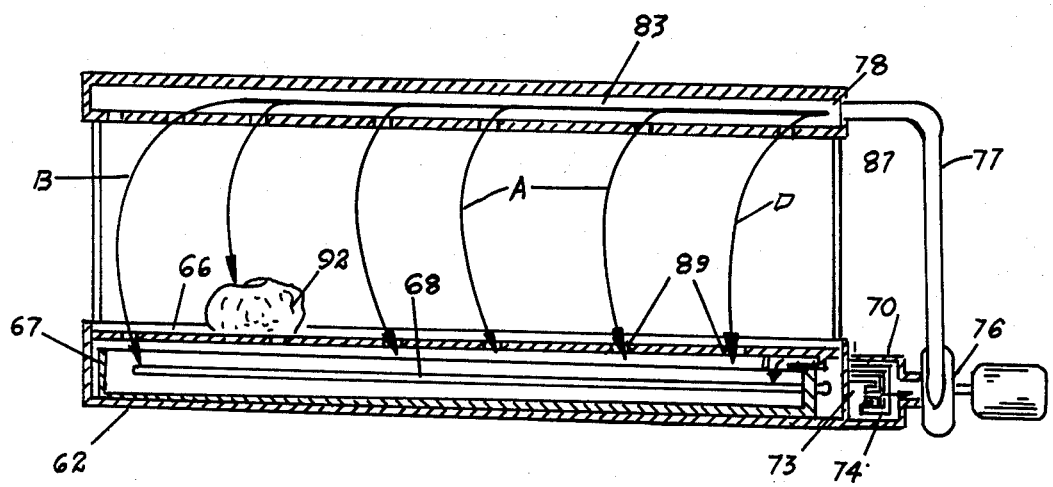
FIG. 11 is a sectional view of the arrangement shown in FIG. 10 in assembled form.

Referring now to FIG. 11 which is a cross-sectional view of the arrangement shown in FIG. 10 in assembled relation, food items 92 are shown in shelf 66 with downflowing air A, B and D emitted from slots 84A, 84B and 84D (where because of the nature of the illustrated flow of air from slot 88C is not shown).

As best shown with respect to streams A and D, a portion of the air from each stream flows to slots 88B and 88D while other portions of the air stream are admitted to base 62 through apertures 89. It will be noted that the portion of air stream D admitted to base 62 through slot 88D flows through baffles 91,92 to be exposed to reservoir 67. Also the portion of the air stream flowing through aperture 89 flows over food items 92.

The air admitted to base 62 through slots 88 A–D and apertures 89 flows over the liquid in reservoir 67 and is admitted through inlet 70 to plenum 73.

While FIG. 11 illustrates gas flow from plenum 78 to base 62, it will be recognized that within the scope of the present invention reverse gas flow can also be utilized where air flows from base 62 to plenum 78.

In accordance with another of the invention, it has been found that gravitational or "natural convection" provides enhanced characteristics for food holding devices of the type contemplated by the present invention wherein the air in an enclosure is heated to a selected temperature after moisture has been added to the air. Typically in the prior art the foods in conventional ovens or cabinets, the foods are heated by hot air but cooled by evaporation of moisture from the surface which produces an unusual dilemma for a device expected to control temperature. While it is on the one hand a heating device, it is also a cooling device. Also, prior art disclosures have regarded high air flow as being important to even temperature distribution throughout the food enclosure but it has been found that high air flow increases the cooling effect further sacrificing the ability to control food temperatures and the quality of foods because it results in excessive drying or shrinkage of the food product. The present invention recognizes that food temperature is a function of air temperature, the humidity of the air to which the food is exposed and the rate of air flow. Typically only one of the three controlling factors is regulated so that food temperature is virtually uncontrolled. Further it has been found that forced convection degrades food by accelerating the shrinkage and/or rapid oxidation of the fats and shortenings that are components of most foods and the food in storage generally supplies all the moisture to the cabinet to control the temperature of the food and additionally increases shrinkage and the need for discarding the food. Finally, food crispness is a function of the amount of air moisture at or near the surface of the food and is controlled by air temperature, moisture or the relative saturation of the air and air flow.

FIG. 12 is a schematic sectional diagram of another arrangement within the scope of the present invention. In FIG. 12 enclosure 121 is provided which, for example, can have an opening such as a door to provide access to food products 122–124 which can be contained on trays 126–128 located therein and retained by means of support bars 131, 132.

As shown, various items of food such as biscuits 122, corn on the cob 123, and chicken 124 can be stored in devices within the scope of the present invention. The foregoing recitation of foods is not by way of limitation and it will be recognized that other types of foods can equally be successfully treated.

It will be noted that no means of forced circulation is provided within the device shown in FIG. 12 and further it will be understood that the trays 126–128 could have apertures (not shown) in the bottom sides thereof to allow circulation of air through the foods or the bottoms can be solid to retain the foods thereon. Circulation is accomplished by convective or natural flow and in the arrangement shown a reservoir 133 is provided in the bottom of enclosure 121 to receive a heater element 134 where a temperature probe 136 is provided in the liquid 137 located within the reservoir. Temperature probe 136 and the leads 138, 139 to heater 134 are connected to a controller 141 which can be a temperature controller to operate the heater element 134 to maintain a selected temperature of the liquid 137 in reservoir 133. By means of the controller 141 heat is supplied to heater 134 to evaporate water from the reservoir 137 as shown by arrows D. The saturated air resulting above reservoir 133 is then passed over a second heater 140 having leads 142, 143 supplied to a second controller 145 where a temperature probe 146 is provided and likewise communicates with controller 145 so that the temperature of heater element 140 is controlled by power supply to leads 142,143. Controller 145 is adjusted to sense the temperature of the air emitted from heater 140 by means of probe 146 and to control the temperature of the water laden air emitted from heater 140 as shown by arrows E. The air then flows upwardly through the area around the trays 126–128 to expose the food contained on the trays to air having a controlled temperature and humidity. The air is then emitted from the top of the food enclosures as represented by the arrows F and G to flow downwardly, outside the retainers 131,132 and into the area of heater 140 where the air is again mixed with heated air and returned to the food in storage.

Controller 141 is set to control the temperature of the water in reservoir 133 at a selected temperature, for example 150° F. so that the air immediately above the reservoir has a vapor pressure equivalent to that temperature. Heater 140 is heated to a higher temperature so that the air represented by arrows E is not saturated but has a temperature above the temperature of the water 137 in reservoir 133. If temperature of the air E were less than or equal to the temperature of the liquids 137 in reservoir 133 saturated air would be passed over the food items so that the food would acquire the temperature in the reservoir 133 and moisture would migrate to the surface and remains there so that the surface of the product would be soft and its crispness character would be diminished. On the other hand by raising the temperature of the air represented by the air E to a temperature higher than the temperature of the liquid 137 in reservoir 133 the crispness is retained since the air exposed to the food is not saturated. It has been found that in the arrangement shown in FIG. 12 in accordance with the present invention even though the door (not shown) of the device is opened to provide access to the food items in storage, the temperature of the reservoir is maintained at the proper level so that upon closing of the door the evaporator gives up the additional moisture needed to replace the moisture lost through opening the door and reestablishes the optimized conditions called for by the food and supplies the moisture necessary as opposed to sacrificing the moisture in the food. In fact, it has been found that within the scope of the present invention food crispness can be adjusted by a simple control, for example soft, medium, crisp, extra crispy surfaces on the the device where the temperature obtained by temperature probe 146 is set after the temperature in reservoir 133 is set. Further it has been found that because vapors can be quickly replaced within the cabinet from the evaporator as opposed to obtaining it from the food, devices within the scope of the present invention offer minimal deterioration to food quality through shrinkage.

This is illustrated in FIG. 13 which shows typical operating characteristics for a device of the type shown in FIG. 12 where the graph illustrates time versus temperature and illustrates a typical temperature of the air E as 146' and a temperature of the liquid 137 in evaporator 133 at line 136'. Curve 151 illustrates a typical effect on, for example a bread product, while curve 152 illustrates the time temperature history of a product such as fried chicken with a crust.

Figure 14:
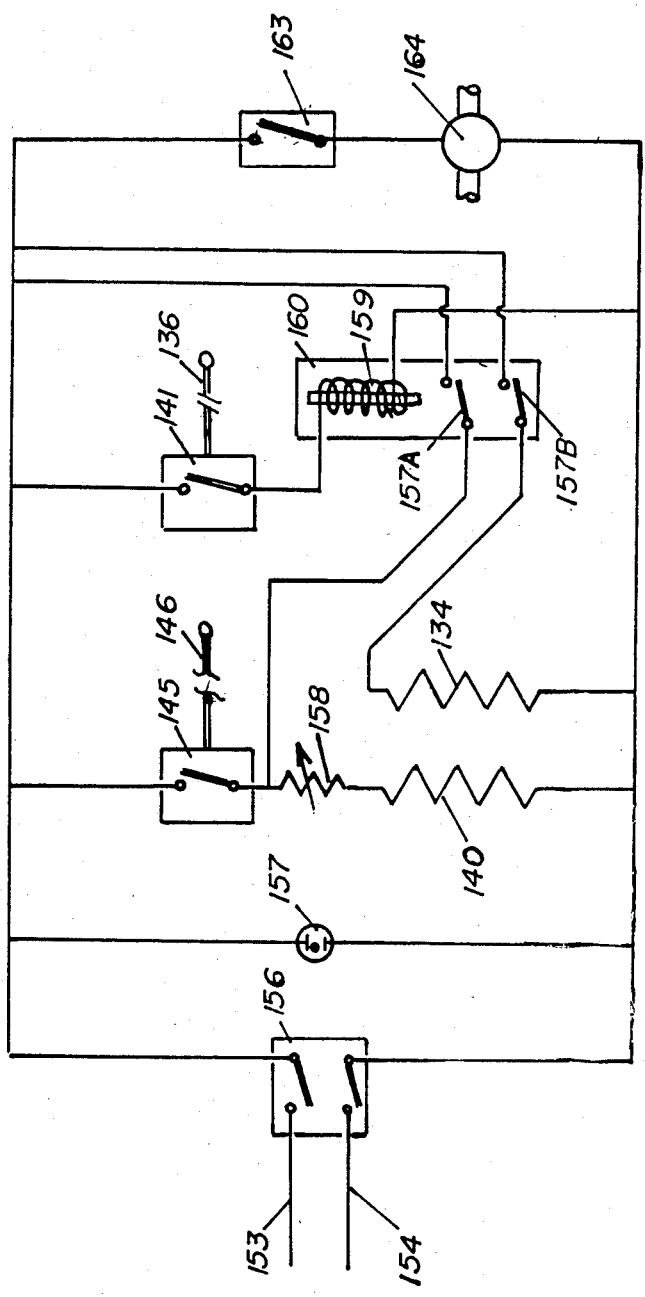
FIG. 14 is a schematic illustration of a control system within the scope of the present invention.

As previously discussed, devices within the scope of the present invention have been found to operate particularly well when operation of the reservoir heater 131 and the air heater 141 are interrelated. FIG. 14 is an illustration of one arrangement within the scope of the present invention to accomplish such a result.

In FIG. 14, where certain of the reference numbers of FIG. 12 are utilized to illustrate similar elements, power supply 153, 154 is shown supplied through a power switch 156 to control operation of the device. A "power on" lamp 157 can be provided to indicate the state of the device. Thermostat 145 is shown and operated in response to change in temperature in chamber 121 as previously described.

However, in the arrangement shown a power control 158, which can for example be a rheostat or solid state current control is provided in series in the power supply to an air heater 140 so that the power supplied to heater 140 can be adjusted in with respect to the current supplied to liquid heater 134. Within the scope of the present invention the heaters can be of the same rating or different ratings depending upon the proportional contribution desired.

Also, heater 140 and 134 can be converted in series through a relay 160 having a coil 159 operating switch 157A to heater 140 and control 158 and switch 157B operating heater 134

In accordance with the features of the present invention heater 134 and 140 are operated simultaneously in response to change in the temperature of the liquid in reservoir 133. The proportion of the total heat contributed by the heaters 134 and 140 is then adjusted by means of control 158 so that the air temperature can be above, or if desired below, the temperature of the liquid in reservoir 133. While in most instances it will be desirable to maintain the air temperatures above the temperature of the liquid in reservoir 133 there are instances, for example where it is desirable to add moisture to the food in cabinet 121 where lower air temperature would be useful but it is necessary to still add heat to the air to maintain the desired temperature characteristic since the addition of moisture to the food is a cooling process.

Also, it has been found that by operating air heater 140 and reservoir heater 134 simultaneously, particularly good results are achieved. In such instances, air heater 140 can also be operated by thermostat 145 to, for example prevent the temperature cabinet 121 from falling below a selected temperature, for example the temperature where liquid might condense in the walls of cabinet 121.

It will be understood that the foregoing is but one example of an arrangement within the scope of the present invention and that various other arrangements and methods also within the scope of the present invention will occur to those skilled in the art upon reading the disclosure set forth hereinafter.

The invention claimed is:

1. An apparatus for processing food at selected temperatures including food holding cabinet means defining a chamber; food support means disposed within said chamber to receive said food to be processed; liquid reservoir means to hold a selected liquid to be evaporated from a surface thereof; first heater means to heat said liquid to be evaporated to a first temperature, second heater means to heat vapor emitted from said liquid to increase the temperature of the vapor above said surface to a second temperature and distribution means to direct said vapor emitted from said surface of said liquid and said second heater means to said food chamber to contact said food to be processed; first control means to simultaneously supply power to said first heater means and said second heater means in response to change in temperature of said liquid in said reservoir and supply power to said first heater means and said second heater means in selected proportional relationship to cause said first and second heater means to supply heat to said liquid and said vapor at a rate equal to said selected proportional relationships.

2. The invention of claim 1 wherein said second temperature is greater than said first temperature.

3. The invention of claim 1 including motive means to circulate air over said liquid reservoir means wherein said air stream emitted from said liquid reservoir means is saturated and is then supplied to said second heater means where said air stream is superheated to said second temperature and is directed to said food chamber.

4. The invention of claim 1 including first switch means operated by said first control means and second control means to sense the temperature of said vapor emitted from said second heater means and to operate second switch means when said first and second switch means are in series relationship to supply power to said first and second heater means when both said first and second switches are closed.

5. The invention of claim 4 wherein said first and second heater means are an electric resistance heater means.

6. The invention of claim 4 including air outlet means advantageously located in said food chamber means for emission of selected quantities of air to the atmosphere.

7. The invention of claim 6 including fan means having air inlet means to receive said vapor from above said reservoir means, and circulate said vapor to said second heater means.

8. The invention of claim 7 where secondary atmosphere air inlet means is provided to communicate with said inlet means of said fan means to provide atmospheric air to be circulated in said cabinet means.

9. The invention of claim 8 wherein said liquid reservoir is located in spaced relation beneath a top of said food storage enclosure to define a portion of said air flow conduit therebetween.

* * * * *